United States Patent

Dow et al.

[11] Patent Number: 5,999,272
[45] Date of Patent: Dec. 7, 1999

[54] BALANCING COMPRESSED STORAGE REQUIREMENTS WITH DECOMPRESSION TIMES DURING PUNT PROTECTION PROCESSING IN A PAGE PRINTER

[75] Inventors: Richard M. Dow, Laramie, Wyo.; Douglas J. Mellor, Meridian; Timothy P. Blair, Boise, both of Id.

[73] Assignee: Hewlett-Packard Company, Palo Alto, Calif.

[21] Appl. No.: 09/175,903

[22] Filed: Oct. 20, 1998

[51] Int. Cl.[6] .............................. G06F 15/00; G06K 9/36
[52] U.S. Cl. ........................................... 358/10.15
[58] Field of Search ................. 395/114, 113, 395/116; 382/232; 358/10.15, 10.14, 10.17, 426, 261.3

[56] References Cited

U.S. PATENT DOCUMENTS

| | | | |
|---|---|---|---|
| 5,129,049 | 7/1992 | Cuzzo et al. | 395/113 |
| 5,479,587 | 12/1995 | Campbell et al. | 395/116 |
| 5,483,622 | 1/1996 | Zimmerman et al. | 395/114 |

OTHER PUBLICATIONS

U.S. Patent Application S/N: 08/958,437; Filed: Oct. 27, 1997; Title: Memory Partitioning For Multi–Resolution Pauseless Page Printing; Inventor(s): Campbell et al.

Primary Examiner—Jerome Grant, II
Attorney, Agent, or Firm—Lane R. Simmons

[57] ABSTRACT

An imaging device and method optimize memory usage during a print overrun avoidance operation by employing selected compression schemes upon page bands while ensuring that required decompression times of the bands are met for subsequent rendering purposes. A preferred method includes compressing a band from a page of image data and, if an estimated decompression time for the compressed band does not satisfy a race-the-laser threshold for subsequent video imaging, then decompressing the band and measuring an actual decompression time. If the actual decompression time satisfies the race-the-laser threshold, then the method includes keeping the compressed band for subsequent video imaging. On the other hand, if the actual decompression time does not satisfy the race-the-laser threshold, then the band is re-compressed using an alternate compression scheme and re-evaluated similar to the originally compressed band to determine whether the recompressed band's decompression time will satisfy the race-the-laser threshold.

21 Claims, 3 Drawing Sheets

BALANCING COMPRESSED STORAGE REQUIREMENTS WITH DECOMPRESSION TIMES DURING PUNT PROTECTION PROCESSING IN A PAGE PRINTER

FIELD OF THE INVENTION

This invention relates in general to image forming devices and, more particularly, to page printer memory management.

BACKGROUND OF THE INVENTION

In printers that employ laser engines as the "print mechanism", data must be provided at a speed that is fast enough to keep up with the print action (which can be measured by the rate of movement of the paper past the imaging drum). In such printers, formatting is either performed on the host computer, with large volumes of rasterized image data shipped to the printer at high speed, or on a formatter within the printer itself. Since a conventional laser printer engine operates at a constant speed, if rasterized image data is not available when a previous segment of image data has been imprinted, a "print overrun" or "punt" occurs and the page is not printable. In essence, the Image Processor that rasterizes the image data "races" the Output Video Task that images the data onto the imaging drum. This is commonly termed "racing the laser".

Several methods have been used in the prior art to avoid print overruns. First, a full raster bit map of an entire page may be stored in the printer so that the print mechanism always has rasterized data awaiting printing. However, this solution requires large amounts of random access memory (RAM) for each page. A second method for assuring the availability of print data to a laser printer is to construct a display list from the commands describing a page. During formatting, a page description received from a host is converted into a series of simple commands, called display commands, that describe what must be printed. The display commands are parsed and sorted according to their vertical position on the page. The page is then logically divided into sections called bands (or page strips), which bands are then individually rendered (i.e., the described objects in the bands are rendered) into a raster bit map and passed to the print engine for printing. This procedure enables lesser amounts of RAM to be used for the print image.

When the display commands are rendered at a fast enough pace, the same memory used to store a first band can be reused for a subsequent band further down the page. For example, in certain prior art printers it is known to employ three raster buffers for storing bands. During page processing, the first buffer is reused for a fourth band on the page, the second is reused for a fifth band, etc. However, under standard (generally maximum) page-per-minute performance, little time is left between finishing printing of a band and when a next band is required to be rasterized from the same print buffer.

Under certain circumstances, "complex" bands will include many display commands and require a longer than normal time for rasterization. Additionally, to rasterize a band (whether "complex" or not), more memory space may be required than is currently available—depending upon several factors associated with the printer, including memory size, memory fragmentation, job to be printed, and other printer system activities. In the case of a complex band, rasterization time may increase to such an extent that the succeeding band can not be delivered on time, thus causing a print overrun to occur. Accordingly, pre-rasterization is commonly performed on a complex band to ensure that the video imaging race with the laser will not cause a print overrun.

Racing the laser requires making a determination regarding how to get the best trade off between printer memory and real time processing requirements. In a properly working printer, a print overrun is avoided because the Image Processor task just manages to win every race with the direct memory access (DMA) video output task. It is undesirable to avoid print overruns by unilaterally pre-rasterizing every video band because (even with compression) that consumes too much precious printer memory for video DMA buffers. As such, one process has been developed to permit minimization of the number of pre-rasterized video buffers and is disclosed in U.S. Pat. No. 5,129,049 to Cuzzo et al., the disclosure of which is incorporated in full herein by reference. This was extended for compression and empirical Image Processor cost measurements in U.S. Pat. No. 5,479,587 to Campbell et al., also incorporated in full herein by reference.

In Campbell et al., in the event of low available memory for processing print commands, each band of a page may be reevaluated and passed through several steps in attempt to reduce memory allocation requirements and free up more memory. For example, each band may be rasterized and compressed using one of several compression techniques. After a band is rasterized and compressed, the memory allocation requirement for that band is determined. If the compressed band's memory allocation requirement is less than the memory allocation requirement of the display list for that same band (relative to a comparison threshold), then the rasterized and compressed version will be used and stored in memory rather than the display list. The rasterized and compressed band is stored in memory by being dissected into fragments (segments) and then linked and distributed into "holes" in the memory. The "holes" are, typically, smaller isolated free areas of memory surrounded by larger unavailable (used) areas. On the other hand, if the rasterized and compressed band's memory allocation requirement is not less than the memory allocation requirement for its display list (per the threshold), then the band may be processed again using a different compression technique. These steps of rasterizing a band, compressing it, comparing the size of the compressed version to the display list, and determining if the memory allocation requirement of the compressed version is less than that of the display list, may be repeated multiple times using differing compression techniques and/or thresholds until the band's allocation requirement is less than that of its display list.

Once all of the bands have been rasterized, compressed, evaluated and distributed (when the threshold was met) then processing of the print commands resumes at the point where the event of low available memory was previously detected (i.e., the point that initiated the reevaluation process for the page). The band that was previously attempting a memory allocation (but detected the low available memory event) should now have a better chance of being able to satisfy its memory allocation.

Distinguishing now from Campbell et al., U.S. Pat. No. 5,483,622 (Zimmerman et al.) discloses a Page Printer Having Automatic Font Compression and is also incorporated herein by reference in full. In Zimmerman et al., in the event of low available memory for processing print commands, alternative steps occur to alleviate the low memory error including: (i) compressing raster graphic images, and (ii) if no raster graphic images are present or if compression of the raster graphic images does not remove the low memory error, then compressing font characters.

Additionally, a large size font whose size exceeds a threshold may automatically be compressed, regardless of a memory low/out signal being present.

With regard to any data that is compressed during image processing, it is generally desirable to utilize a compression algorithm that achieves a high compression ratio in order to minimize memory usage and maximize free space. However, a greater decompression time typically accompanies an increased compression ratio that is achieved. Importantly, the decompression time must be accounted for when the compressed data is output/rendered by the video task. Simply stated, too much decompression time can cause a print overrun (punt) in the race against the laser.

Accordingly, an object of the present invention is to improve punt protection processing by balancing memory savings compression requirements with resultant decompression times in the race against the laser.

SUMMARY OF THE INVENTION

According to principles of the present invention in a preferred embodiment, an imaging device and method optimize memory usage during a print overrun avoidance operation by employing selected compression schemes upon page bands while ensuring that required decompression times of the bands are met for subsequent rendering purposes. A preferred method includes compressing a band from a page of image data and, if an estimated decompression time for the compressed band does not satisfy a race-the-laser threshold for subsequent video imaging, then decompressing the band and measuring an actual decompression time. If the actual decompression time satisfies the race-the-laser threshold, then the method includes keeping the compressed band for subsequent video imaging. On the other hand, if the actual decompression time does not satisfy the race-the-laser threshold, then the band is re-compressed using an alternate compression scheme and re-evaluated similar to the originally compressed band to determine whether the recompressed band's decompression time will satisfy the race-the-laser threshold.

Other objects, advantages, and capabilities of the present invention will become more apparent as the description proceeds.

DETAILED DESCRIPTION OF THE INVENTION

Figure 1:
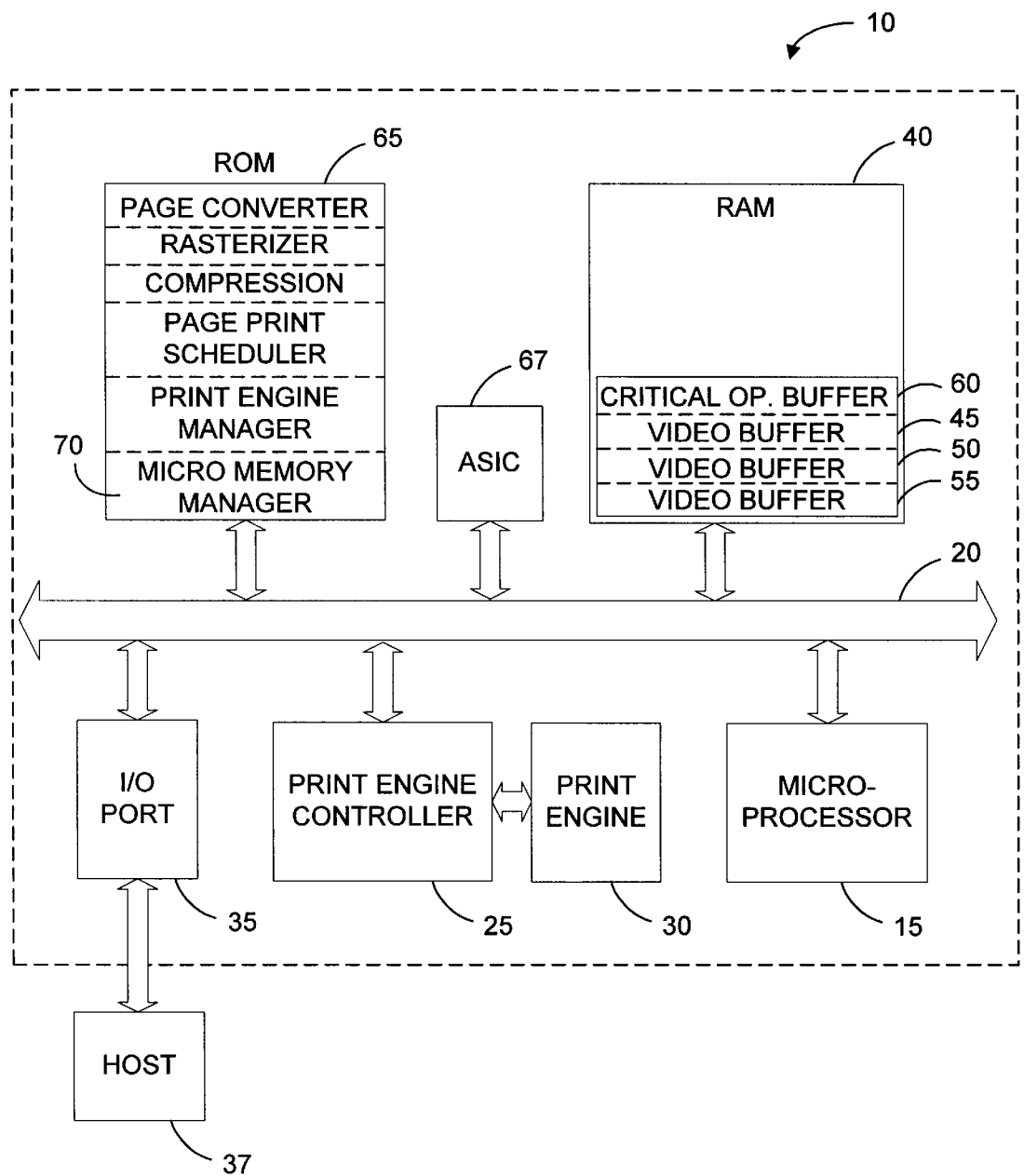
FIG. 1 is a block diagram of a laser printer embodying the present invention system and method for balancing memory saving compression requirements with decompression rendering times during punt protection processing.

FIG. 1 is a high level block diagram of a page printer 10 incorporating the present invention system and method for balancing/optimizing memory saving compression requirements with decompression rendering times during punt protection processing. Page printer 10 is controlled by a microprocessor 15 which communicates with other elements of the system via bus 20. A print engine controller 25 and associated print engine 30 connect to bus 20 and provide the print output capability for the page printer. Print engine 30 is preferably a laser printer that employs an electrophotographic drum imaging system as well known in the art. However, as will be obvious to those of ordinary skill in the art, the present invention is similarly applicable to other types of printers and/or imaging devices such as digital copiers, facsimile devices and the like.

An input/output (I/O) port 35 provides communications between page printer 10 and host computer 37, and receives page descriptions from the host for processing within page printer 10. A dynamic random access memory (RAM) 40 provides a main memory for the page printer. For purposes of discussion herein, RAM 40 is representative of a general purposes memory and/or a cache memory associated with processor 15, both as well known in the art. A first portion of RAM 40 includes three (in this example) pre-allocated (reserved) buffers 45, 50 and 55 (hereinafter 45–55) which are employed during band processing. These buffers may be video buffers (in a preferred embodiment) or some other pre-allocated buffers. During the print process, each pre-allocated video buffer receives a selected band's rasterized image data for storing and passing the same to print engine controller 25 and print engine 30. Only after one of the buffers 45, 50 or 55 becomes available (i.e., the band's rasterized data is transferred/imaged onto the drum), can a next band of rasterized data be inserted. During a print job, these video buffers are constantly in use for temporarily storing the rasterized image data prior to being output to the print engine.

A second portion of RAM 40 includes another pre-allocated (reserved) buffer 60. Buffer 60 is a critical operations buffer and is used for storing critical operation data for the express purpose of performing memory management operations. Using buffer 60 reduces printing pauses by the print engine during multi-page print job processing which would potentially otherwise occur due to fragmentation of general memory area 40 and the general contention for memory therein during processing of print commands.

Preferably, critical operations buffer 60 is used to store data that requires a contiguous allocation of memory. For example, data stored in critical operations buffer 60 may include, selectively, pre-rasterized data, compressed data, pre-rasterized and compressed data, rendered character bitmaps, scaled raster objects, rotated raster objects, vector path data, or other data used for defragmenting memory 40. Additionally, the data is stored in buffer 60 only temporarily relative to band data stored and processed in general memory 40. Namely, it is temporary because the buffer is released for further use after completion of the critical operation (i.e., pre-rasterization, compression, etc.), but at least upon the close of a page being printed.

Advantageously, buffer 60 provides a reserved, contiguous area of memory for certain critical operations during page processing without, generally, having to wait for memory to be freed up in general memory 40 and without having to flush out video buffers 45–55 (i.e., without waiting for them to be flushed). A preferred embodiment, of the critical operations buffer is further described in U.S. patent application Ser. No. 08/958,437 and is incorporated herein by reference in full.

A read only memory (ROM) 65 holds firmware which controls the operation of microprocessor 15 and page printer 10. Although the firmware routines are discussed in reference to being stored in ROM 65, it is understood that their functionality may likewise be implemented in ASIC 67 if so desired. The routines (code procedures) stored in ROM 65 may include the following: a page converter, rasterizer, compression code, page print scheduler and print engine manager. The page converter firmware converts a page description received from the host to a display command list (wherein each display command defines an object to be printed on the page). The rasterizer firmware converts each display command to an appropriate bit map (rasterized band) and distributes the bit map into memory 40. The compression firmware compresses the rasterized bands or other data as necessary. Each of these routines may be conventional in the art.

Importantly, ROM 65 further includes a micro memory manager 70 according to the present invention. Micro memory manager 70 governs the memory management issues according to the present invention during punt protection processing for balancing memory savings with decompression times as will be described more fully herein.

When a page is closed for processing (i.e., all bands have been evaluated, rasterized, compressed, etc. for processing by print engine 30) then the rasterized bands are stored in turn to one of the pre-allocated buffers 45–55 and subsequently passed to print engine 30 by print engine controller 25, thereby enabling the generation of an image (i.e., text/graphics etc). The page print scheduler controls the sequencing and transferring of band buffers to print engine controller 25. The print engine manager controls the operation of print engine controller 25 and, in turn, print engine 30.

Figure 2:
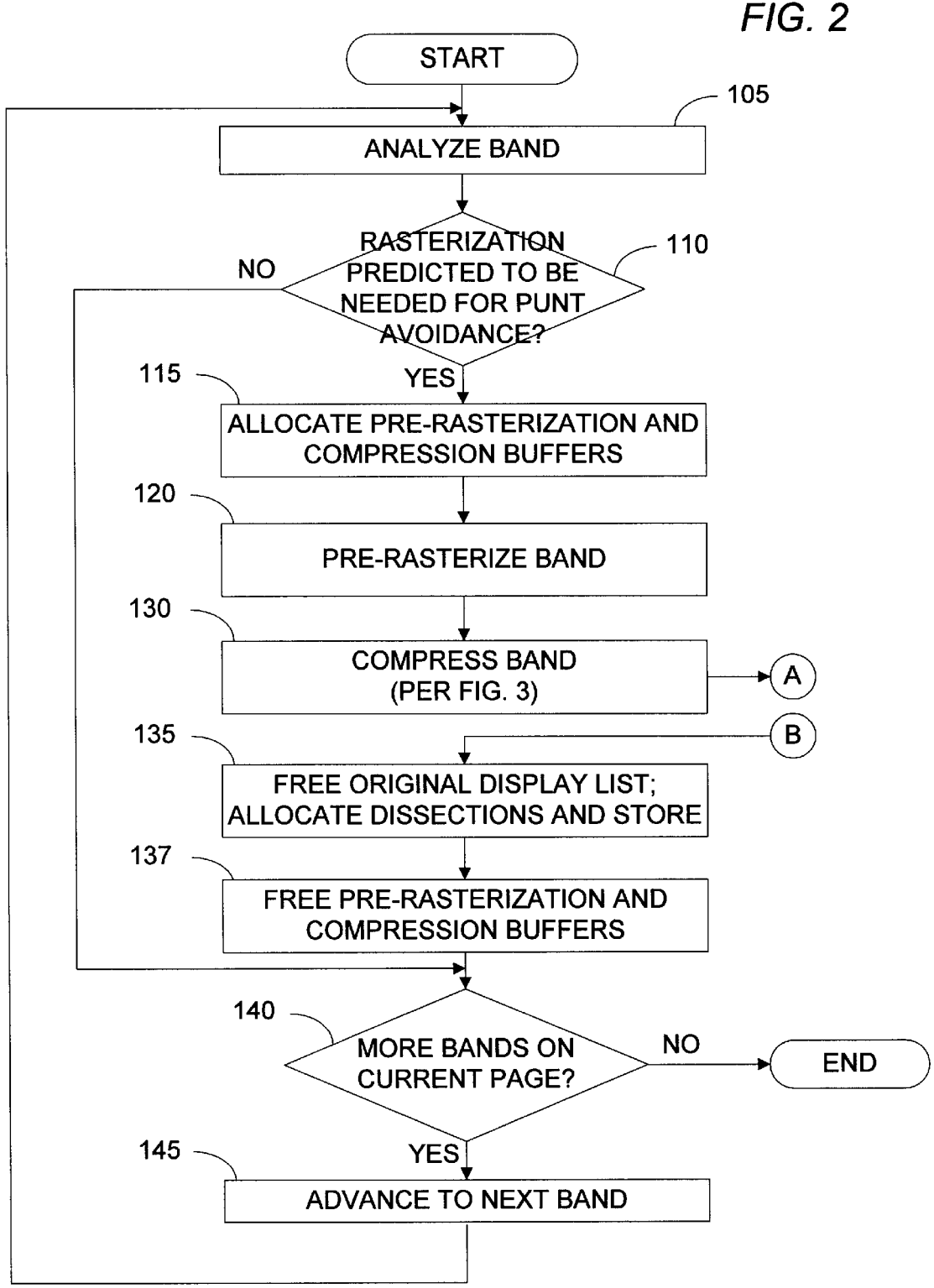
FIGS. 2–3 are flow charts depicting a preferred method of the present invention during punt protection processing in the printer of FIG. 1.
Figure 3:
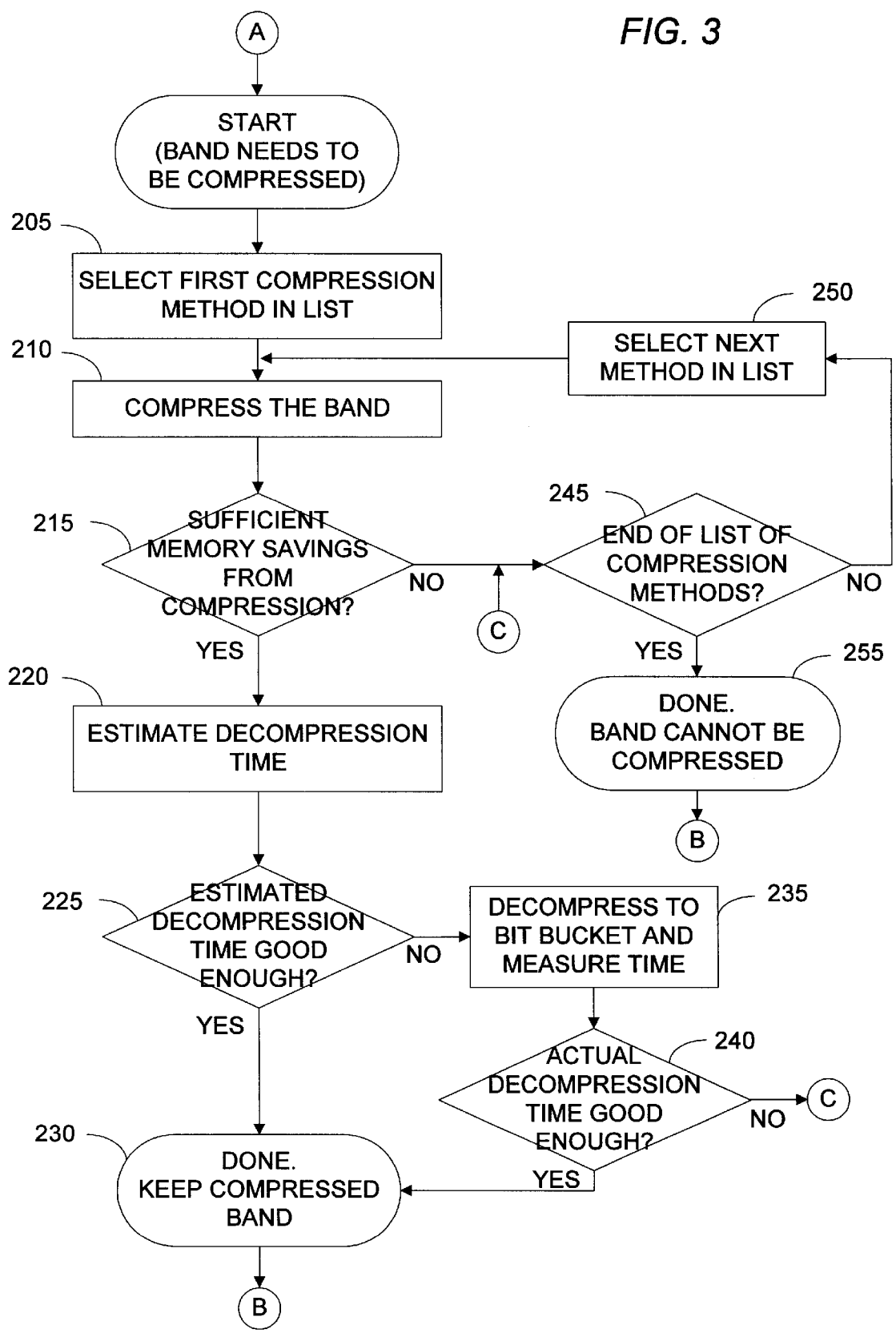

Referring now to FIG. 2 and FIG. 3, these flow charts depict a punt protection process of printer 10 and a preferred method of the present invention for balancing compression and memory savings with decompression times during the punt protection processing. Namely, after a current page has been composed into display lists and before the page is released for printing, a punt avoidance process occurs. Conventionally, the main purpose of the punt avoidance process was simply to assure that the page would not punt by pre-rasterizing certain bands. However, under principles of the present invention, an additional purpose is to use less memory for the current page by compressing certain pre-rasterized bands to avoid memory faults and multi-page job pauses and, furthermore, to balance the reduced memory usage with the decompression time associated with each band that must be accounted for in order to ultimately render each band without punting.

Thus, in reference now to FIG. 2, a band (page strip) from a page of image data is analyzed 105 to determine whether pre-rasterization needs to occur for punt avoidance 110. This analysis may occur as conventional in the art (for example, see Cuzzo et al. and refer to the discussion herein regarding racing the laser). Simply put, this analysis is a calculated estimate of whether pre-rasterization should occur in order to avoid punting. If it is determined that pre-rasterization is needed 110, then pre-rasterization and compression buffers are allocated 115 and the band is pre-rasterized 120.

Next, the band is compressed 130 per the present invention process described more specifically in reference to FIG. 3. This includes balancing the desire to maximize free memory space with the reality that compressed bands require time to decompress prior to being video imaged. The details of FIG. 3 will be discussed subsequently hereto. In any case, once the band is compressed 130, the original display list that is associated with this band is freed 135 from memory 40, the band is dissected and allocated (i.e., the band's dissections are allocated) to holes in memory 40 and stored therein 135, and the pre-rasterization and compression buffers (that were used to pre-rasterize and compress the band 115) are released (freed) 137.

If there are more bands on the current page 140, image processing (or punt protection processing) advances to the next band 145 and analysis occurs again 105 as previously discussed. If there are no more bands 140, then the punt protection process is finished for the current page.

Referring now to FIG. 3, this flow chart depicts more specifically a preferred method of the present invention. First, 205, a compression method is initially selected (from an available list of methods) that will yield a highest compression ratio for maximizing free space in memory 40. In a preferred embodiment, the compression methods that are available for selection range from no compression applied, to firmware-based compression methods, to hardware based compression methods. The band is then compressed using the selected compression method 210.

Next, if sufficient memory savings is achieved 215 (i.e., if the actual compression of the band is sufficient relative to a predetermined threshold), then the decompression time is estimated 220 for that band (relative to the compression method used). If the estimated decompression time is good enough 225, or in other words, if the decompression time meets the required decompression time with sufficient margin to avoid a punt when the band is subsequently video imaged, then this pre-rasterized and compressed band is kept 230 as the final state of the band to be used in the rendering process (i.e., video imaging or race-the-laser process).

Once a compression method satisfies the memory savings threshold 215 for the band, but the estimated decompression time 220 does not satisfy the "race-the-laser" threshold 225, then the band is actually decompressed 235 and its actual decompression time is measured. Preferably, the compressed band is decompressed to a "bit bucket" 235 so that the compressed band 210 remains intact in memory 40 even after actual decompression occurs 235. Importantly, under the present invention, if the actual decompression time 235 does satisfy the "race-the-laser" threshold 240 (contrary to what was originally estimated 220), then the pre-rasterized and compressed band is kept 230 as the final state of the band to be used in the rendering process.

On the other hand, if the actual decompression time 235 does not satisfy the "race-the-laser" threshold 240, then another compression/decompression algorithm must be used in order to avoid a punt. Consequently, the list of compression methods is checked 245 to determine if another compression method exists that will satisfy the memory savings threshold 215 and decompression time thresholds 225, 240. If there is another compression method available, then that method is selected 250 and the band is re-compressed 210 and re-checked to determine if sufficient memory savings is achieved 215.

This process of trying another compression method 245, 250 and 210 to satisfy the space savings threshold 215 and/or to satisfy the race-the-laser time threshold 225, 240 continues until a compression method is found that does satisfy the particular space/time threshold at issue. However, if no compression method satisfies the memory savings requirements 215, 245, or if no compression method satisfies the race-the-laser time threshold 225, 240, 245, then the band cannot be compressed 255 (although it may be "deemed" to be "compressed" for implementation purposes even if the compression ratio is just one to one). In this context, no memory savings is obtained. However, at least the band is guaranteed to race the laser successfully because the band is uncompressed raster data that is "engine-ready" and requires no further processing during the race-the-laser rendering time.

In summary, the present invention provides a mechanism and method during punt protection to ensure that a band of data satisfies a memory savings threshold when it is compressed and also satisfies a race-the-laser time threshold upon decompression during video imaging in an imaging device such as a laser printer. It will be obvious to one of ordinary skill in the art that the present invention is easily implemented utilizing any of a variety of components and tools existing in the art. Moreover, while the present invention has been described by reference to specific embodiments, it will be apparent that other alternative embodiments and methods of implementation or modification may be employed without departing from the true spirit and scope of the invention.

What is claimed is:

1. A method of image processing in an imaging device, the method comprising:
    (a) compressing a band from a page of image data;
    (b) if an estimated decompression time for the compressed band does not satisfy a race-the-laser threshold for subsequent video imaging, then decompressing the band and measuring an actual decompression time; and,
    (c) if the actual decompression time satisfies the race-the-laser threshold, then keeping the compressed band for subsequent video imaging.

2. The method of claim 1 further including pre-rasterizing the band prior to compressing the band.

3. The method of claim 1 further including estimating a decompression time for the compressed band subsequent to compressing the band and prior to determining if the estimated decompression time does not satisfy the race-the-laser threshold.

4. The method of claim 1 wherein decompressing the band occurs to a bit bucket such that the compressed band remains intact.

5. The method of claim 1 further including, if the estimated decompression time satisfies the race-the-laser threshold, then keeping the compressed band for subsequent video imaging without actually decompressing the band before the band is ready to be imaged.

6. The method of claim 1 further including, if the actual decompression time does not satisfy the race-the-laser threshold, then re-compressing the band using an alternate compression method, and repeating steps (b) and (c) as necessary for the band compressed with the alternate compression method.

7. The method of claim 1 wherein the imaging device is a printer, copier or facsimile machine.

8. A computer-readable medium having computer-executable instructions for performing steps in the method recited in claim 1.

9. A method of punt protection processing in an imaging device, the method comprising:
    (a) pre-rasterizing a band from a page of image data;
    (b) compressing the band;
    (c) if a memory savings threshold is not achieved for the compressed band, then re-compressing the band using an alternate compression method;
    (d) if a memory savings threshold is achieved for the compressed band, then estimating a decompression time for the compressed band;
    (e) if the estimated decompression time does not satisfy a race-the-laser threshold for subsequent video imaging, then decompressing the band and measuring an actual decompression time; and,
    (f) if the actual decompression time satisfies the race-the-laser threshold, then keeping the compressed band for subsequent video imaging.

10. The method of claim 9 wherein decompressing the band occurs to a bit bucket such that the compressed band remains intact.

11. The method of claim 9 further including, if the estimated decompression time satisfies the race-the-laser threshold, then keeping the compressed band for subsequent video imaging without actually decompressing the band.

12. The method of claim 9 further including, if the actual decompression time does not satisfy the race-the-laser threshold, then re-compressing the band using an alternate compression method, and repeating steps (c), (d), (e) and (f) as necessary for the band compressed with the alternate compression method.

13. The method of claim 9 wherein the imaging device is a printer, copier or facsimile machine.

14. An imaging device comprising:
    (a) a print engine;
    (b) a memory operatively connected to the print engine for holding a compressed band from a page of image data;
    (c) means for decompressing the compressed band and measuring an actual decompression time if an estimated decompression time for the compressed band does not satisfy a race-the-laser threshold for subsequent video imaging; and,
    (d) means for video imaging the compressed band if the actual decompression time satisfies the race-the-laser threshold.

15. The imaging device of claim 14 wherein the imaging device is a printer, copier or facsimile machine.

16. The imaging device of claim 14 wherein the compressed band is a pre-rasterized compressed band.

17. The imaging device of claim 14 further including means for determining the estimated decompression time for the compressed band.

18. The imaging device of claim 14 wherein the means for decompressing includes means for decompressing to a bit bucket such that the compressed band remains intact.

19. The imaging device of claim 14 further including means for decompressing and video imaging the compressed band if the estimated decompression time for the compressed band satisfies the race-the-laser threshold.

20. The imaging device of claim 14 further including means for re-compressing the band using an alternate compression method after decompressing the compressed band if the actual decompression time does not satisfy the race-the-laser threshold, and further including means for submitting the re-compressed band for processing by means elements (c) and (d) as necessary.

21. The imaging device of claim 14 further including means for re-compressing the band using an alternate compression method if the compressed band does not satisfy a memory savings threshold.

* * * * *